(12) United States Patent
Frieder et al.

(10) Patent No.: US 7,779,006 B2
(45) Date of Patent: Aug. 17, 2010

(54) PEER-TO-PEER FILE SHARING

(75) Inventors: Ophir Frieder, Chicago, IL (US); Wai Gen Yee, Chicago, IL (US)

(73) Assignee: Illinois Institute of Technology, Chicago, IL (US)

( * ) Notice: Subject to any disclaimer, the term of this patent is extended or adjusted under 35 U.S.C. 154(b) by 747 days.

(21) Appl. No.: 11/298,027

(22) Filed: Dec. 9, 2005

(65) Prior Publication Data

US 2007/0136370 A1 Jun. 14, 2007

(51) Int. Cl.
*G06F 7/00* (2006.01)
*G06F 17/30* (2006.01)

(52) U.S. Cl. ...................................... 707/736
(58) Field of Classification Search ........................ None
See application file for complete search history.

(56) References Cited

U.S. PATENT DOCUMENTS

| | | | |
|---|---|---|---|
| 2002/0049760 A1* | 4/2002 | Scott et al. | 707/10 |
| 2003/0182270 A1* | 9/2003 | Kuno et al. | 707/3 |
| 2004/0093321 A1* | 5/2004 | Roustant et al. | 707/3 |
| 2005/0091289 A1* | 4/2005 | Shappell et al. | 707/201 |
| 2005/0108203 A1* | 5/2005 | Tang et al. | 707/3 |
| 2005/0190273 A1* | 9/2005 | Toyama et al. | 348/231.5 |
| 2005/0216473 A1* | 9/2005 | Aoyagi et al. | 707/10 |
| 2005/0267945 A1* | 12/2005 | Cohen et al. | 709/215 |
| 2007/0274327 A1* | 11/2007 | Kaarela et al. | 370/401 |

OTHER PUBLICATIONS

Yee, W.G., Jai, D., Frieder, O, "Finding Rare Data Objects in P2P File-Sharing Systems," The Fifth IEEE International Conference on Peer-to-Peer Computing (Sep. 1, 2005).
Meng, W., Yu, C., Liu, K.L., "Building Efficient and Effective Metasearch Engines," ACM Computing Surveys, 34(1), pp. 48-89 (2002).
Yee, W.G., Frieder, O., "On Search in Peer-to-Peer File Sharing Systems," ACM SAS (2005).
Ratnasamy, S., Francis, P., Handley, M., Karp, R., Shenker, S., "A Scalable Content-Addressable Network," In Proceedings of ACM SIGCOMM 2001.
Stoica, I., Morris, R., Liben-Nowell, D., Kamer, D.R., Kaashoek, M.F., Dabek, F., Balakrishnan, H., "Chord: A Scalable Peer-to-Peer Lookup Protocol for Internet Applications," IEEE/ACM Transactions on Networking, vol. 11, No. 1, pp. 17-32 (Feb. 2003).

* cited by examiner

*Primary Examiner*—Neveen Abel Jalil
*Assistant Examiner*—Raheem Hoffler
(74) *Attorney, Agent, or Firm*—Pauley Petersen & Erickson

(57) ABSTRACT

A peer-to-peer (P2P) file sharing system is provided with an enhanced search method for a client node therein. A search from the client contains a primary search of metadata words and a secondary search of content file keys taken from the primary search results. The results of the secondary search are then used to rerank the results of the primary search before the client displays the results of the search to the user. Metadata distribution schemes can also be used to further enhance the utility of the system. Enhanced P2P file searching accuracy is thus provided. Applications for selective peer-to-peer communication may further be employed.

19 Claims, 2 Drawing Sheets

Issue secondary queries

Query $Q'1 = \{K_{F1}\}$,

Query $Q'2 = \{K_{F2}\}$

Secondary Search

Return Results and Group by key $K_i$

Group G'1: R2, R5, R6, R7 all with $\{K_{F2}\}$

Group G'2: R1, R3, R4 all with $\{K_{F1}\}$,

Ranking (by group size – note other ranking metric possible)

1. Group G'1 $\{K_{F2}\}$
2. Group G'2 $\{K_{F1}\}$,

Fig. 1
Primary Search (known art)

Files
Replica R1 of File F1: descriptor = {A, B, C | $K_{F1}$}.
Replica R2 of File F2: descriptor = {A, C | $K_{F2}$}
Replica R3 of File F1: descriptor = {A, B | $K_{F1}$}
Replica R4 of File F1: descriptor = {D | $K_{F1}$}
Replica R5 of File F2: descriptor = {F | $K_{F2}$}
Replica R6 of File F2: descriptor = {F, G | $K_{F2}$}
Replica R7 of File F2: descriptor = {H, I | $K_{F2}$}

Query invocation
Q1 Query {C} returns links to R1 {A, B, C | $K_{F1}$} & R2 {A, C | $K_{F2}$}
Q2 Query {B} returns links to R1 {A, B, C | $K_{F1}$} & R3 {A, B | $K_{F1}$}
Q3 Query {A} returns links to R1 {A, B, C | $K_{F1}$}, R2 {A, C | $K_{F2}$}, & R3 {A, B | $K_{F1}$}
Q4 Query {A, B, C} returns links to R1 {A, B, C | $K_{F1}$}
Q5 Query {A, B, C, D} returns no links Group by key $K_i$ (note – in conventional peer-to-peer file sharing systems, file name also possible)
Query {A}
   Group G1: R2 ($K_{F2}$)
   Group G2: R1 & R3 ($K_{F1}$)

Ranking (by Group Size)
   1. Group G2 ($K_{F1}$)
   2. Group G1 ($K_{F2}$)

Fig. 2
Secondary Search

Issue secondary queries
Query Q'1={$K_{F1}$},
Query Q'2={$K_{F2}$}

Return Results and Group by key $K_j$
Group G'1: R2, R5, R6, R7 all with {$K_{F2}$}
Group G'2: R1, R3, R4 all with {$K_{F1}$}, Ranking (by group size – note other ranking metric possible)
1. Group G'1 {$K_{F2}$}
2. Group G'2 {$K_{F1}$},

PEER-TO-PEER FILE SHARING

BACKGROUND OF THE INVENTION

Peer-to-peer (P2P) file sharing is a major peer-to-peer application, with millions of users sharing millions of files and consuming a large proportion of Internet bandwidth. In such a large-scale system, it is important to supply good search capabilities, lest the user be overwhelmed with search results. However, the search capabilities of these systems are weak, particularly in ranking query results.

In a pure peer-to-peer system, true clients and servers do not really exist because each node functions simultaneously as a both a server and a client. However, as an aide to understanding the present invention, and not by way of limitation, the following terminology as may be used herein is explained. A client is a machine running a software routine seeking and receiving information. A server is a machine in the P2P file sharing system acting as a data repository and provider. A content file is a data object that is a unique set of data, e.g., song, picture, or any other thing in digital format. A replica is a copy of a content file. A node is one or more machines acting as one location in the network. A node will simply be referred to as a computer herein, and is meant to encompass all automated data handling apparatuses.

Standard file sharing models include the common P2P file sharing systems Gnutella and Kazaa. These systems make very few assumptions about the behavior of users and about the data they share. Peers of a P2P file sharing system collectively share a set of content files by maintaining local replicas of them. Each replica of a content file (e.g., a music file) is identified by a descriptor. A descriptor is a metadata set, which comprises terms (i.e., a "bag of words"). Depending on the implementation, a term may be a single word or a phrase. P2P searching consists of identifying content files through a search of the descriptors of the individual content files.

A peer acts as a client by initiating a particular query for a content file. A query is also a metadata set, composed of terms that a user thinks best describe the desired content file. A query is routed to all reachable peers, which act as servers. Query results are metadata references to content files that fulfill the matching criterion. The matching criterion in known P2P systems requires that the content file's descriptor contain all the query terms.

A query result contains the content file's descriptor as well as the identity of the present server. The descriptor helps the user distinguish the relevance of the content file to the query, and the server identity is required to initiate the content file's download.

Once the user selects an object, a local replica of the content file is made by downloading it from the server. In addition, the user has the option of manipulating the local replica's descriptor in his own computer. He may manipulate it for personal identification or to better share it in the P2P file sharing system.

Much of the known P2P improvement work proposes a focus on the architecture of P2P file sharing systems to improve searching by identifying highly reliable peers, and giving them specialized roles in statistics maintenance, indexing, and routing. The performance of such systems can be impressive; however, the application domain is different than the one presently considered. The present invention makes no assumptions about the relative capabilities of the peers, and so is more applicable to ad hoc environments, where functionality is fully distributed among all participants.

SUMMARY OF THE INVENTION

Known P2P file sharing search accuracy is poor; thus, there exists a need for its improvement. Use of the present invention has been found experimentally to improve ranking accuracy by up to fifteen percent over known P2P ranking approaches.

In one embodiment of the present invention, using relevance feedback improves the ranking of search results in P2P file sharing systems. Improved ranking potentially decreases the time needed to find desired content files, improving the usability of the application. It may also decrease the overall load on the system, as more focused search results are more likely to reduce any tendency a user might have to download a content file that is desirable, but irrelevant to the original query. Finally, results ranked properly will reduce the need to pose additional queries.

In the present invention, there is a primary metadata query and one or more secondary queries used for reranking of the primary search results. No new content files are added by a secondary query, the initial content files are just ranked more effectively, and a broader range of term metadata may be made available to the user. In the primary query, the client retrieves a set of results, each of which is described by metadata terms contained in a descriptor, or their equivalents as may be modified by a search engine via, for example but not limited to, stemming techniques, substring matches, or thesauri, such as song title. Another unit of metadata in every descriptor is a hash key that globally, and for practical purposes uniquely, identifies the corresponding content file. It is assumed that each unique content file has this identifying hash key, also sometimes herein merely called a key, and this key is contained in all of the descriptors of all the replicas of a content file. If not provided for in the P2P system, then a key generator should be instituted. The key may, for example, be automatically generated by hashing the bits of the content file using SHA-1, see www.itl.nist.gov/fipspubs/fip180-1.htm.

After the primary query term metadata results are returned to the client, grouped and ranked by a primary ranking metric, the primary results, or a desired number (N) thereof, whether all or a subset of the results, which may be a top N number or may be another subset, may be given a revised ranking, or not, as dictated, by using the primary results content files' hash key descriptors in the one or more secondary queries, whereby a second opinion of the ranking of the results of the metadata term search may be obtained. That is, after the keys of N results from the primary query are sent out in the secondary query or queries, the results of the secondary query or queries are returned to the client, grouped, and reranked by a selected secondary metric, and these results are displayed to the user.

The present invention assumes that the first set of results is meaningfully ranked, but this ranking will often be flawed due to the way that results are returned to the client; that is, all query terms must exist in the descriptors of each result. This results in a skewed set of metadata, likely negatively impacting the ranking quality. Since all content file descriptors are assumed to contain, or are provided with, a hash key, then searches utilizing this key will likely return a more unbiased sample of metadata describing the content file using the collective metadata of many sources. This unbiased sample should be better for ranking than the initial skewed one.

It is noted that within other fields of traditional information management, such as Information Retrieval (IR) and Database Management Systems (DBMS), various schemes are used for refining searches. However, the techniques known in these fields are not considered analogous to the field of known P2P file sharing systems. For example, IR search engines are known to use a technique called Query Expansion, which in IR works by addition of terms to a query prior to an initial query execution. Query Expansion in IR is thus not relevant to the present invention. As another example, IR search engines are known to use a technique called relevance feedback (RF) as a way of improving the quality of search result ranking. But in the RF of traditional IR systems, typically the second query is the union of the original query terms with other metadata terms selected from the top N documents retrieved in response to the first query. This combination of the primary query terms with terms selected from the top documents retrieved in response to the primary query may and typically does introduce previously not present results to the result set. Unlike IR, the second query of the present invention uses the set of hash keys from the selected N documents obtained from the first search. That is, the first query terms are not part of the second query. Furthermore, in the present invention, no additional content files are returned. Rather, the content files, or a subset thereof, e.g., possibly only the top N, from the initial result set are returned, and given improved rankings.

In DBMS, query results are by definition accurate. In DBMS searching, any query refinement is defined in terms of query optimization for timing performance, not accuracy of results. Thus, DBMS querying is unrelated to the present invention.

Generally a P2P system according to the present invention provides a method of improving the ranking of search results in a peer-to-peer system, by performing the steps of inputting a P2P search query into a computer; performing a primary search of a P2P system using metadata terms relating to the initially entered user query; returning the results of the primary search to the computer; operating on the results of the primary search by using a ranking revision operation to perform a ranking of the primary search results, and, if dictated, reranking the results of the primary search according to the results of the secondary search, and displaying the reranked search results in human perceivable form. We use the term "reranked" to indicate that the ranking may be revised, or may stay the same, depending on the circumstances of the specific P2P file search.

According to one embodiment of a P2P system of the present invention, a user issues a primary query on the client by specifying a descriptor to all available server nodes. The servers then independently compare the received query against descriptors of their resident replicas and the servers return links and descriptors of their replicas relevant to the primary query. The client then groups the primary search results by key number. The grouped results are then ranked according to a primary ranking metric, such as frequency of occurrence, or other known ranking function.

Considering "all available server nodes" it is contemplated by the present invention that processes for selective peer-to-peer communication may be instituted in the present system. Security systems may be instituted to allow either of the client nodes or server nodes to judge the desirability of sharing files with particular nodes or classes of nodes. Such judgments may be based on any number of criteria, including the trustworthiness of the node, the quality of the node, the location or activity history of the node, etc. It is further contemplated that a fee system may be instituted in the present system for charging and/or payment of content fees. For example, some nodes may be identified as a dominant market source, or otherwise offer preferential content or services for certain types of files, which would justify payment. For example, a server may be identified as a preferential source due to its download speed, or the quality of its bitstreams for song files, or the like, and thus merit payment of fee to utilize that server node. The creation of custom applications, or the adaptation of known applications, for accomplishing such purposes, and their implementation, is considered to be within the skill of the art.

The keys from the selected N results of the primary query are extracted, and secondary queries are issued from the client for each key, one per key, of the selected N results. The servers then independently compare the received secondary, hash key, query against the descriptors of their resident replicas. The servers then return the links and descriptors of the replicas relevant to the secondary query as the secondary search results. The secondary search results returned to the client node are then grouped by key. The grouped secondary search results are ranked according to a selected secondary ranking metric and reported to the user.

The user can then repeat the above process with manually refined queries until satisfied with the results. The user then selects a desired replica; the corresponding client software downloads it; the corresponding client software creates a descriptor for it (which terms may be modified by the user); and the corresponding client software becomes a server for it.

BRIEF DESCRIPTION OF THE DRAWINGS

FIG. 1 illustrates a P2P search using known techniques.
FIG. 2 illustrates a secondary P2P search using techniques according to the present invention.

DETAILED DESCRIPTION OF THE EMBODIMENTS

Discussion of the present invention will be given herein with respect to specific exemplary embodiments that are in some cases arbitrarily or specifically designated for explanatory purposes. It will be appreciated by the person having ordinary skill in the art that aspects of the present invention may be arranged in a variety of ways and that other nomenclature than is used herein might be applied without doing violence to the spirit of the present invention. The invention illustratively disclosed herein suitably may be practiced in the absence of any element, part, step, component, or ingredient which is not specifically disclosed herein.

As seen in FIG. 1, an illustration of a known P2P search, there are two different content files, F1 and F2, which are contained among seven replicas, R1-R7. The metadata descriptors of the replicas contain word descriptors, or terms, represented by the uppercase letters; and hash keys, designated by "$K_i$". The replicas R1, R3 and R4 contain content file F1. The replicas R2 and R5-R7 contain content file F2. Note that each file has a different descriptor due to the word descriptors, i.e., terms, of the metadata. But, within all the metadata there are only two different hash keys, one for each unique content file. The content file desired by the user, may, for example be a song file. The word descriptors of the metadata may be a song title, a band name, an album name, an abbreviated song title, etc., as devised by each peer and stored in the peer machine, i.e., a "server" in the present P2P description. The content file keys, $K_{F1}$ and $K_{F2}$, in the metadata, however, are derived from a hashing process performed by computer on the bit stream of the file data, and thus will be the same for each same content file.

Next, in FIG. 1, various queries, Q1-Q5, are initiated by a user, through a client machine, to try to find a desired song file, by using a word search, i.e., metadata term search, illustrated by the uppercase letters in brackets. Remember that a search result will only be returned if the word descriptors in the Replica's metadata matches all of the search terms entered by the user. The search terms, or terms relating to the search terms, such as their equivalents as may be modified by a search engine via, for example but not limited to, stemming techniques, substring searches, or thesauri, are used for the primary search. Thus, the results of Q1-Q5 are listed in FIG. 1 as they would be returned. Q1 returns two replicas, each having one content file apiece. Q2 returns two replicas with one content file. Q3 returns three replicas, two with the F1 content file and one with the F2 content file. Q4 returns one replica. Q5 returns no replicas. The conventional P2P system then groups the results, here for Query Q3, grouped into G1 and G2. In a conventional P2P search the results may be grouped by either of key or file name, although use of keys is illustrated in FIG. 1. The groups G1 and G2 are then ranked by group size, here according to group size as the primary search ranking metric, with G2 being the larger group and thus ranked and displayed as the number one result. Ranking of groups in the primary search can be computed according to any of many known ranking criteria, e.g., group size, term frequency, cosine similarity, etc.

Referring also now to FIG. 2, illustrating an improvement of the present invention, a reranking scheme is applied to the results of the original, primary search Q3, as illustrated in FIG. 1. Secondary queries, Q'1 and Q'2, are initiated on the results of the top-ranked results of primary search Q3 by the client, which are not even shown to the user. Q'1 is a query for replicas having the content file of Group 2, i.e., a search for the key $K_{F1}$. Q'1 returns the three replicas, R1, R3 and R4, with the $K_{F1}$ content file metadata.

Q'2 is a query for replicas having the content file of Group 1, i.e., $K_{F2}$. Q'2 returns the four replicas, R2 and R5, R6, R7 with the $K_{F2}$ content file metadata. The P2P system of the present invention then groups the results, here G'1 and G'2.

The secondary search result groups are then ranked by a selected secondary search ranking metric, shown as being according to group size, although other metrics are possible. Further, the secondary search ranking metric need not be the same as the primary search ranking metric. G'1 having four replicas, is listed as number 1. G'2, having three replicas, is listed as number 2. It will be noted that the ranking of the results has changed from the conventional search, placing the group containing content file $K_{F2}$ in the first position. Further, more results, i.e., metadata descriptors of the content files, have been returned from the secondary queries. The results from the secondary search, assumed to be fuller, and more accurate, are then displayed in human readable form for the user of the client machine. Selective peer-to-peer communication applications, as described above, may be instituted at any appropriate point in the process(es).

From experimental results, it was determined that group size is the best primary search ranking function. Group size works well because most queries are, of course, for popular content files and such queries are likely to return the most results, as they are highly replicated in the system. Other ranking functions perform relatively poorly because they suffer primarily from skewed metadata associated with each group, caused by the exact matching criterion used in standard P2P systems. For example, because the groups' metadata are skewed, cosine similarity (vsm) will not function properly; the groups' metadata do not accurately reflect the term distributions of the corresponding content files. Moreover, the queries may be too short to represent user interests.

A client in the present invention could be a Gnutella-based P2P file sharing system that incorporates information retrieval functionality, and adds at least two things that ordinary Gnutella clients do not. First, a client can implement many more ranking functions such as term frequency and cosine similarity. Typical commercial P2P file sharing clients only implement group size ranking. Second, secondary search queries can be issued. Third, the present P2P file sharing system can perform special metadata distribution as further discussed below.

The goal of secondary ranking and metadata distribution is to create descriptors that improve the overall ranking performance of the P2P file-sharing system. The metadata works in tandem with the ranking technique toward this goal. With typical clients, such as Limewire's, the content file's descriptor is a replica of that which exists on the server from which it was downloaded. With the present system, the metadata can be heuristically copied from the aggregated metadata of a group of results, increasing the variety of descriptors that exist on the system. Appropriate metadata distribution techniques have been experimentally determined. Five metadata distribution techniques were considered: Single Server (server) where the client creates a descriptor that is a duplicate of the descriptor of a particular server; Random (rand) where the probability of each unique term in the selected group's descriptor of being replicated is uniform; Weighted Random (wrand) where the probability of each term in the selected group's descriptor of being replicated is proportional to its relative frequency; Most Frequent (mfreq) where the most frequent terms in the group are replicated; and Least Frequent (lfreq) where the least frequent terms in the group are replicated.

It was determined that any metadata distribution technique aside from copying-from-a-single-server performs well when using group size as the primary ranking function. From experimental results, it is clear that a most-frequent metadata distribution technique, in conjunction with either term frequency or precision as the secondary ranking function, is the most effective function in improving performance. This result should not be surprising as there is a natural interaction between these ranking functions and the metadata distribution technique. The most frequently occurring terms in a query are likely the most frequently occurring terms in a descriptor. If those terms are selected regularly through metadata distribution, then their frequency in result descriptors will increase, further increasing the effectiveness of term frequency and precision ranking.

One of the benefits of using a reranking scheme according to the present invention is that it improves the discovery of rare content files, which can be a problem in P2P file sharing systems. As mentioned above, group size is an effective ranking function because it takes advantage of the fact that popular content files are highly replicated, and it is immune to the skew in the results' metadata caused by the matching criterion. Secondary queries solve this problem because their results are not biased by the matching criterion. It is therefore expected that, with the appropriate ranking functions, rare content can better be found.

Of course, using the present invention to find rare content files requires that the desired content file be one of the selected N results of the initial query. If this is not the case, the user can increase the value of N, manually add results to those that will be involved in the secondary search, or randomly sample N results from the initial result set.

In P2P file sharing systems, the cost associated with performing secondary queries is in terms of server load and also in terms of increased network traffic. There are many ways to minimize the impact of this problem. One way to limit the network cost is by reducing the number of secondary queries to perform. The cost of increasing the number of secondary queries is linear, but should be accompanied by a commensurate increase in ranking quality leading to a drop in the number of primary search iterations.

The present invention also contemplates sampling a subset of the results from servers. Instead of having all reachable servers return all results, the servers have a fixed probability of returning results. The idea behind this technique is to return a smaller sample of metadata that preserves the term distribution of the full set. Probabilities of 25%, 50%, and 75% were considered in this work although other probabilities are also possible. As might be expected, the number of results decreases linearly with the percentage of results sampled. When all results are returned, the performance is best, with increases in the number of results that are ranked first and second. Improved performance is observed at the 100%, 75%, and 50% probability levels. Performance is poor at the 25% level because too few results are returned, adding too much variance in the result set.

The improvement of ranking quality of the selected N results in P2P file sharing systems according to the present invention will thus be understood. Reranking can be used in the present invention to find additional descriptive metadata to improve ranking. Besides improved ranking, a side benefit of the present invention is that rare content files can be more easily found. The cost of this enhanced performance is in terms of increased network load. This cost can be attenuated using various techniques that limit the number of results returned, potentially at the price of diminished ranking quality. Further an increase in ranking quality should lead to a drop in the number of primary search iterations thus lessening network load.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method for implementing a search for a content file in a peer-to-peer (P2P) file sharing system formed of multiple server computers, the method comprising:
   receiving a P2P search query in a client computer, wherein the client computer is one of the multiple server computers of the P2P system;
   performing a primary search of a first plurality of the other server computers of the P2P system using terms relating to the P2P search query, wherein the primary search is initiated in the P2P system by the client computer;
   returning the results of the primary search to the client computer;
   the client computer grouping the results of the primary search and ranking N number of the groups according to a first ranking metric;
   the client computer automatically selecting a metadata descriptor from at least one of the N number of the groups of the primary search and performing a secondary search of a second plurality of the other server computers of the P2P system based on said metadata descriptors, wherein the secondary search is initiated in the P2P system by the client computer;
   returning the results of the secondary search to the client computer;
   the client computer grouping the results of the secondary search according to their hash keys in the client computer and ranking the results of the secondary search according to a second ranking metric;
   reranking the results of the primary search based upon the ranked results of the secondary search; and
   displaying the reranked primary search results in human perceivable form.

2. The method of claim 1 wherein the first ranking metric is group size.

3. The method of claim 1 wherein the second ranking metric is one of either term frequency or precision.

4. The method of claim 1 further comprising processing for selective peer-to-peer communication for each of the primary and secondary searches.

5. The method of claim 4 wherein said processing for selective peer-to-peer communication includes limiting the first and second plurality of server computers using a security system or a fee system.

6. A method for implementing a search for a content file in a peer-to-peer (P2P) file sharing system formed of multiple server computers, the method comprising:
   receiving a P2P search query in a client computer;
   the client computer initiating a primary search in the P2P system;
   performing the primary search of a first plurality of the server computers of the P2P system using terms relating to the initially entered query;
   the client computer receiving results of the primary search and grouping the results of the primary search according to their hash keys and ranking the groups of the primary search by a primary ranking function to determine N number of ranked search results groups;
   the client computer initiating a secondary search in the P2P system;
   performing the secondary search of a second plurality of the server computers of the P2P system using at least one of the hash keys;
   the client computer receiving results of the secondary search and grouping the results of the secondary search according to their hash keys in the client computer and ranking the results of the secondary search by a secondary ranking function;
   the client computer reranking the results of the primary search based upon the ranked results of the secondary search; and
   displaying the reranked primary search results in human perceivable form.

7. The method of claim 6 wherein the primary ranking function is group size.

8. The method of claim 7 wherein the secondary ranking function is one of either term frequency or precision.

9. The method of claim 6 further comprising processing for selective peer-to-peer communication for each of the primary and secondary searches.

10. The method of claim 9 wherein said processing for selective peer-to-peer communication includes limiting the first and second plurality of server computers using at least one of a security system or a fee system.

11. A method of improving the ranking of search results in a peer-to-peer (P2P) system of individual peer computers, comprising the steps of:
   one of the peer computers issuing a primary query including word descriptors to a first plurality of other peer computers in the P2P system;
   the one of the peer computers receiving and ranking results from the primary query by a primary ranking function to determine N number of ranked search results, wherein each of the results includes a hash key;
   the one of the peer computers selecting a plurality of hash keys from the results of the primary query;

the one of the peer computers issuing a secondary query for one or more of the selected hash keys to a second plurality of other peer computers in the P2P system;

the one of the peer computers receiving results of the secondary query and grouping the results of the secondary query according to their hash keys in the client computer and ranking the results of the secondary query by a secondary ranking function;

the one of the peer computers using the ranked results of the secondary query to rerank the results of the primary query; and the one of the peer computers displaying the reranked search results in human perceivable form.

12. The method of claim 11 wherein a primary search ranking function is group size.

13. The method of claim 11 wherein a secondary search ranking function is one of either term frequency or precision.

14. The method of claim 11 wherein each of the hash keys is a key that uniquely identifies a content file.

15. The method of claim 11 further comprising processing for selective peer-to-peer communication for each of the primary and secondary searches.

16. The method of claim 15 wherein said processing for selective peer-to-peer communication includes limiting the first and second plurality of server computers using at least one of a security system or a fee system.

17. The method of claim 1, wherein the second plurality of server computers is identical to the first plurality of server computers.

18. The method of claim 6, wherein the second plurality of server computers is identical to the first plurality of server computers.

19. The method of claim 1, wherein the first plurality of server computers and the second plurality of server computers each comprise peer machines independent of the client computer.

* * * * *